(12) United States Patent
Cha et al.

(10) Patent No.: US 11,702,964 B2
(45) Date of Patent: Jul. 18, 2023

(54) HYBRID POWER GENERATION EQUIPMENT AND CONTROL METHOD THEREOF

(71) Applicant: DOOSAN ENERBILITY CO., LTD, Changwon (KR)

(72) Inventors: Song-Hun Cha, Osan (KR); Hyun Soo An, Yongin (KR); Sung Gju Kang, Yongin (KR); Young Gun Go, Yongin (KR); Kyoung Taek Oh, Changwon (KR); SangPil Jo, Sejong (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 73 days.

(21) Appl. No.: 17/120,190

(22) Filed: Dec. 13, 2020

(65) Prior Publication Data
US 2022/0136411 A1  May 5, 2022

(30) Foreign Application Priority Data

Oct. 30, 2020 (KR) .................. 10-2020-0143270
Dec. 2, 2020 (KR) .................. 10-2020-0166648

(51) Int. Cl.
*F02C 6/18* (2006.01)
*F01K 21/04* (2006.01)
(Continued)

(52) U.S. Cl.
CPC ............ *F01K 21/047* (2013.01); *F01D 15/10* (2013.01); *F01K 23/10* (2013.01); *F02C 6/18* (2013.01); *F02C 7/224* (2013.01)

(58) Field of Classification Search
CPC .......... F01K 21/047; F01K 23/10; F02C 6/18; F02C 7/224; Y02E 20/16; Y02E 20/14; F01D 15/10
See application file for complete search history.

(56) References Cited

U.S. PATENT DOCUMENTS 3,095,699 A * 7/1963 Baver ................... F01K 23/103
    60/39.182
6,247,315 B1 * 6/2001 Marin ................... F01K 23/105
    60/672

(Continued)

FOREIGN PATENT DOCUMENTS

JP    05090106 U    12/1993
JP    06212909 A    8/1994
(Continued)

*Primary Examiner* — Thomas P Burke
(74) *Attorney, Agent, or Firm* — Harvest IP Law, LLP (57) ABSTRACT

Disclosed is a hybrid power generation facility. The hybrid power generation facility includes a gas turbine including a compressor configured to compress air introduced from an outside, a combustor configured to mix the compressed air with fuel and to combust the air and fuel mixture, and a turbine configured to produce power with first combustion gas discharged from the combustor, a boiler including a combustion chamber and a burner installed in the combustion chamber and into which the first combustion gas discharged from the turbine of the gas turbine is introduced, a steam turbine through which steam generated in the combustion chamber passes, a first GT (gas turbine) pipeline connected between the turbine of the gas turbine and the burner, a first air pipeline connected to the first GT pipeline to supply oxygen to the burner, a first oxygen sensor installed at an inlet of the burner to measure an oxygen concentration of a fluid flowing into the burner, and a first GT damper installed in the first GT pipeline to control a flow rate of the fluid flowing through the first GT pipeline according to the oxygen concentration measured by the first oxygen sensor.

15 Claims, 2 Drawing Sheets

(51) Int. Cl.
*F02C 7/224* (2006.01)
*F01D 15/10* (2006.01)
*F01K 23/10* (2006.01)

(56) References Cited

U.S. PATENT DOCUMENTS

| | | | |
|---|---|---|---|
| 6,430,914 B1 * | 8/2002 | Goidich | F01K 23/061 60/39.12 |
| 2013/0302739 A1 * | 11/2013 | Hori | F23N 5/006 431/12 |
| 2017/0350319 A1 * | 12/2017 | Wu | F02C 9/50 |
| 2018/0328231 A1 * | 11/2018 | Nagai | F23J 15/006 |

FOREIGN PATENT DOCUMENTS

| | | |
|---|---|---|
| JP | 11132402 A | 5/1999 |
| JP | 2019095174 A | 6/2019 |

\* cited by examiner

HYBRID POWER GENERATION EQUIPMENT AND CONTROL METHOD THEREOF

CROSS REFERENCE TO RELATED APPLICATIONS

This application claims priority to Korean Patent Application No. 10-2020-0143270, filed on Oct. 30, 2020 and Korean Patent Application No. 10-2020-0166648, filed on Dec. 2, 2020, the disclosures of which are incorporated herein by reference in their entireties.

BACKGROUND

1. Field

The present disclosure relates to a hybrid power generation facility and a control method thereof, and more particularly, to a hybrid power generation facility for generating electric power using a driving force generated by a gas turbine and a steam turbine, and a control method thereof.

2. Description of the Related Art

There are various types of power plants depending on fuel used. A thermal power plant heats water in a boiler using thermal energy generated by burning fuels such as coal, heavy oil, and natural gas, and passes a high temperature and high pressure superheated steam produced through a steam turbine so that a generator connected to the steam turbine generates electricity.

The thermal power plant further includes main equipment and balance of plant (BOP) systems. The BOP systems include, for example, a fuel supply system, a fuel treatment system, a condensate and water supply system, a cooling water system, a reprocessing system, and auxiliary systems such as air treatment system, water treatment system, service water treatment system, and waste water treatment system. The main equipment and BOP systems play their roles in electricity production.

On the other hand, a combined cycle power plant is a power plant that combines a primary power generation cycle in which a gas turbine is driven with fuel such as natural gas or diesel and a secondary power generation cycle in which a steam turbine is driven with steam generated by passing the heat of exhaust gas discharged from the gas turbine through a heat recovery steam generator (HRSG). The combined cycle power plant has the advantage of 10% higher thermal efficiency, lesser pollution, and shorter resting time than the advantage of conventional thermal power plants.

A conventional combined cycle power plant combines a gas turbine and a boiler to take the advantages of the gas turbine and the boiler. However, since there is a limit in absorbing the heat of the exhaust gas of the gas turbine, it is difficult to improve an overall efficiency of the facility or to reduce an emission of carbon dioxide.

In addition, the conventional combined cycle power plant has more advantages than a coal-fired boiler in that a boiler thereof uses natural gas for combustion, but is disadvantageous compared to a gas turbine generator in that energy efficiency is low and adjustment of a combustion speed is slow to maintain combustion stability.

SUMMARY

The present disclosure has been made to overcome the limitations or disadvantages of conventional arts, and an objective of the present application is to provide a hybrid power generation facility capable of maximizing the overall efficiency of the facility, increasing load followability, and securing operation safety, and to provide a control method thereof.

According to an aspect of the present disclosure, there is provided a hybrid power generation facility including: a gas turbine including a compressor configured to compress air introduced from an outside, a combustor configured to mix the compressed air supplied from the compressor with fuel and to combust the air and fuel mixture, and a turbine configured to produce power with first combustion gas supplied from the combustor; a boiler including a combustion chamber and a burner installed in the combustion chamber and into which the first combustion gas discharged from the turbine of the gas turbine is introduced; a steam turbine through which steam generated in the combustion chamber passes; a first GT (gas turbine) pipeline connecting the turbine of the gas turbine and the burner to each other; a first air pipeline connected to the first GT pipeline and configured to supply oxygen to the burner; a first oxygen sensor installed at an inlet of the burner and configured to measure a concentration of oxygen of the first combustion gas supplied to the burner; and a first GT damper installed in the first GT pipeline and configured to adjust a flow rate of a fluid flowing through the first GT pipeline according to the oxygen concentration measured by the first oxygen sensor.

In a flow direction of the fluid flowing through the first GT pipeline, the first GT damper may be disposed on an upstream side of a connection point between the first GT pipeline and the first air pipeline, and the first oxygen sensor may be disposed on a downstream side of the connection point.

The boiler may further include an air preheater installed in the combustion chamber, and the hybrid power generation facility may further include a second air pipeline branched from the first air pipeline to supply oxygen to the air preheater and a second GT pipeline branched from the first GT pipeline and connected to the second air pipeline.

The hybrid power generation facility may further include a first air damper installed in the first air pipeline, a second air damper installed in the second air pipeline, and a second GT damper installed in the second GT pipeline.

The hybrid power generation facility may further include a first heat exchanger through which the first air pipeline extends and second combustion gas discharged from the combustion chamber passes so that oxygen flowing through the first air pipeline is heat-exchanged with the second combustion gas in the first heat exchanger.

The hybrid power generation facility may further include a third air pipeline extending through the first heat exchanger to supply oxygen to the burner and a fuel pipeline supplying fuel introduced from an outside to the third air pipeline.

The hybrid power generation facility may further include a first heat exchange pipeline transferring the second combustion gas discharged from the combustion chamber through the first heat exchanger, a second oxygen sensor installed in the first heat exchange pipeline and configured to measure a concentration of oxygen of the combustion gas, and a forced draft fan installed in the first air pipeline and configured to adjust a pressure of oxygen and a flow rate of a fluid supplied to the first heat exchanger according to the oxygen concentration measured by the second oxygen sensor.

The hybrid power generation facility may further include a second heat exchanger through which feed water preheated by steam discharged from the steam turbine passes, a first heat exchange pipeline configured to transfer the second combustion gas discharged from the combustion chamber through the first heat exchanger, and a second heat exchange pipeline branched from the first heat exchange pipeline and configured to transfer the second combustion gas discharged through the second heat exchanger.

The hybrid power generation facility may further include: a first temperature sensor installed in the first heat exchange pipeline at an outlet of the first heat exchanger and configured to measure a temperature of the second combustion gas passing through the first heat exchanger; and an auxiliary damper installed in the second heat exchange pipeline at an inlet of the second heat exchanger and configured to adjust a flow rate of the second combustion supplied to the second heat exchanger according to the temperature measured by the first temperature sensor.

The hybrid power generation facility may further include: a first steam pipeline configured to transfer steam from the combustion chamber to a steam turbine; a second steam pipeline configured to return a fluid discharged from the steam turbine to the combustion chamber; a feed water pipeline configured to supply feed water preheated by steam discharged from the steam turbine to the second heat exchanger; a third steam pipeline configured to transfer steam passing through the second heat exchanger to the second steam pipeline; a second temperature sensor installed in the third steam pipeline and configured to measure a temperature of a fluid flowing through the third steam pipeline; and a feed water valve installed in the feed water pipeline and configured to adjust a flow rate of steam supplied to the second heat exchanger according to the temperature measured by the second temperature sensor.

The first oxygen sensor may measure a concentration of oxygen of a fluid supplied to the burner, and determine whether the measured concentration is greater than or equal to a first reference concentration, and the first GT camper may throttle the first GT pipeline to reduce a flow rate of the fluid or block the first GT pipeline if the measured concentration is lower than the first reference concentration.

The first temperature sensor may measure a temperature of the second combustion gas discharged from the first heat exchanger through the first heat exchange pipeline, and determine whether the measured temperature is equal to or lower than a first reference temperature, and the auxiliary damper may operate to open the second heat exchange pipeline if the measured temperature of the second combustion gas discharged from the first heat exchanger through the first heat exchange pipeline is higher than the first reference temperature.

If the measured temperature of the second combustion gas discharged from the first heat exchanger through the first heat exchange pipeline is equal to or lower than the first reference temperature, the first temperature sensor may measure the temperature of the second combustion gas discharged from the first heat exchanger through the first heat exchange pipeline and determine whether the measured temperature is equal to or higher than a second reference temperature. If the measured temperature is lower than the second reference temperature, the auxiliary damper may operate to reduce the flow rate of fluid flowing through the second heat exchange pipeline or block the second heat exchange pipeline.

The second oxygen sensor may measure a concentration of oxygen of the second combustion gas discharged from the boiler and supplied to the first heat exchanger through the first heat exchange pipeline, and determine whether the measured concentration is equal to a second reference concentration. If the measured concentration is lower than the second reference concentration, a vane of the forced draft fan may be opened, and if the measured concentration is higher than the second reference concentration, the vane of the forced draft fan may be adjusted to reduce the flow rate of the second combustion gas.

According to another aspect of the present disclosure, there is provided a method of controlling a hybrid power generation facility including a gas turbine including a compressor configured to compress air introduced from an outside, a combustor configured to mix compressed air supplied from the compressor with fuel and to combust the air and fuel mixture, and a turbine configured to produce power with first combustion gas discharged from the combustor, a boiler including a combustion chamber and a burner installed in the combustion chamber and into which the first combustion gas discharged from the turbine of the gas turbine is introduced, a steam turbine through which steam generated in the combustion chamber passes, a first GT (gas turbine) pipeline connected between the turbine of the gas turbine and the burner, a first air pipeline connected to the first GT pipeline to supply oxygen to the burner, a first oxygen sensor installed at an inlet of the burner to measure an oxygen concentration of a fluid flowing into the burner, and a first GT damper installed in the first GT pipeline to adjust a flow rate of a fluid flowing through the first GT pipeline according to the oxygen concentration measured by the first oxygen sensor, the method including: measuring, by the first oxygen sensor, a concentration of oxygen of the fluid supplied burner; determining whether the measured concentration is greater than or equal to a first reference concentration; and throttling, by the first GT damper, the first GT pipeline to reduce a flow rate of the fluid if the measured concentration is lower than the first reference concentration.

The hybrid power generation facility may further include a first heat exchanger through which the first air pipeline extends and second combustion gas discharged from the combustion chamber passes such that oxygen flowing through the first air pipeline is heat-exchanged with the second combustion gas in the first heat exchanger, a second heat exchanger through which a portion of steam discharged from the steam turbine passes, a first heat exchange pipeline configured to transfer the second combustion gas discharged from the combustion chamber through the first heat exchanger, a second heat exchange pipeline branched from the first heat exchange pipeline and configured to transfer the second combustion gas through the second heat exchanger, a first temperature sensor installed in the first heat exchange pipeline at an outlet of the first heat exchanger and configured to measure a temperature of the second combustion gas passing through the first heat exchanger, and an auxiliary damper installed in the second heat exchange pipeline at an inlet of the second heat exchanger and configured to control a flow rate of the second combustion gas supplied to the second heat exchanger according to the temperature measured by the first temperature sensor. The method may further include measuring, by the first temperature sensor, a temperature of the second combustion gas discharged from the first heat exchanger through the first heat exchange pipeline; determining whether the measured temperature is equal to or lower than a first reference temperature; and opening, by the auxiliary damper, the second heat exchange pipeline if the measured temperature is higher than the first reference temperature.

The method may further include determining whether the measured temperature of the second combustion gas discharged from the first heat exchanger is equal to or higher than a second reference temperature if the measured temperature of the second combustion gas discharged from the first heat exchanger through the first heat exchange pipeline is equal to or lower than the first reference temperature; and reducing, by the auxiliary damper, a flow rate of a fluid by throttling the second heat exchange pipeline if the measured temperature of the second combustion gas discharged from the first heat exchanger through the first heat exchange pipeline is lower than the second reference temperature.

The hybrid power generation facility may further include a first heat exchanger through which the first air pipeline extends and the second combustion gas discharged from the combustion chamber passes such that oxygen flowing through the first air pipeline is heat-exchanged with the second combustion gas, a first heat exchange pipeline configured to transfer the second combustion gas discharged from the combustion chamber through the first heat exchanger, a second oxygen sensor installed in the first heat exchange pipeline and configured to measure an oxygen concentration of the second combustion gas supplied to the first heat exchanger, and a forced draft fan installed in the first air pipeline and configured to adjust a pressure of the oxygen supplied to the first heat exchanger according to the oxygen concentration measured by the second oxygen sensor. The method may further include: determining whether the measured concentration of oxygen of the second combustion gas discharged from the boiler and supplied to the first heat exchanger through the first heat exchange pipeline is a second reference concentration; opening a vane of the forced draft fan if the measured concentration is lower than the second reference concentration; and reducing a flow rate of the second combustion gas by throttling the vane of the forced draft fan if the measured concentration is higher than the second reference concentration.

In the hybrid power generation facility and the control method thereof according to the present disclosure, the first combustion gas discharged from the gas turbine is directly introduced into the air preheater through the second air pipeline, and the opening of the first GT damper is adjusted according to the oxygen concentration measured by the first oxygen sensor installed in the first GT pipeline 114. Therefore, the hybrid power generation facility can be operated without excessively limiting the flow rate of the first combustion gas supplied to the boiler, and the overall operation efficiency of the hybrid power generation facility can be increased by adjusting a mixing ratio of the first combustion gas and the oxygen supplied to the boiler.

In the hybrid power generation facility and the control method thereof according to the present disclosure, the first heat exchanger is provided so that the oxygen supplied to the facility is preheated by the second combustion gas discharged from the boiler, and a portion of the second combustion gas which cannot be absorbed by the first heat exchanger passes through the second heat exchanger. Therefore, it is possible to recover the heat of the second combustion gas through the second heat exchanger, thereby increasing the overall operation efficiency of the facility.

DETAILED DESCRIPTION OF THE DISCLOSURE

Various modifications and various embodiments will be described in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

Hereinafter, exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

Figure 1:
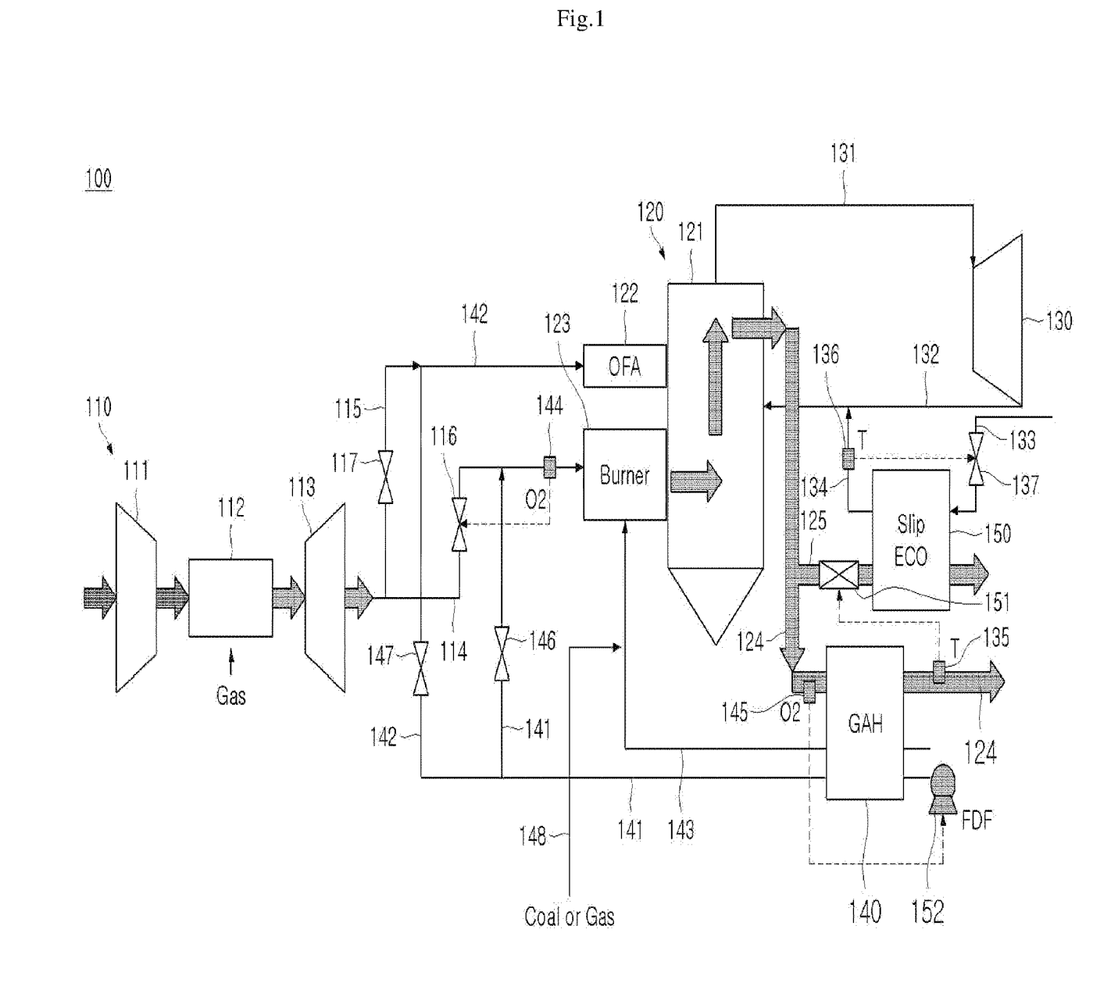
FIG. 1 is a diagram of a hybrid power generation facility according to an exemplary embodiment.

Referring to FIG. 1, a hybrid power generation facility 100 according to an exemplary embodiment includes a gas turbine 110, a boiler 120, a steam turbine 130, a first heat exchanger 140, a second heat exchanger 150, a forced draft fan 152, a first GT (gas turbine) pipeline 114, a second GT pipeline 115, a first GT damper 116, a second GT damper 117, a first air pipeline 141, a second air pipeline 142, a third air pipeline 143, a fuel pipeline 148, a first oxygen sensor 144, a second oxygen sensor 145, a first air damper 146, a second air damper 147, a first heat exchange pipeline 124, a second heat exchange pipeline 125, an auxiliary damper 151, a first steam pipeline 131, a second steam pipeline 132, a feed water pipeline 133, a third steam pipeline 134, a first temperature sensor 135, a second temperature sensor 136, and a feed water valve 137.

The gas turbine 110 includes a compressor 111, a combustor 112, and a turbine 113. The compressor 111 compresses air introduced from the outside to produce compressed air. The combustor 112 mixes the compressed air supplied from the compressor 111 with fuel and burns the air-fuel mixture. The turbine 113 generates electric power using first combustion gas supplied from the combustor 112.

The boiler 120 includes a combustion chamber 121, an air preheater 122, and a burner 123. The combustion chamber 121 generates steam by using thermal energy generated by burning a mixture of the first combustion gas, oxygen, and fuel. Combustion of the mixture of the first combustion gas, oxygen, and fuel produces a second combustion gas as a by-product. The air preheater 122 installed in the combustion chamber 121 supplies over-firing air (OFA) to the combustion chamber 121. The burner 123 installed in the combustion chamber 121 receives the first combustion gas discharged from the turbine 113 of the gas turbine 110 and oxygen flowing through the first air pipeline 141 or the third air pipeline 143. In addition, the burner 123 mixes the first combustion gas and the oxygen and burns the gas-oxygen mixture in the combustion chamber 121 to generate second combustion gas.

One end of the first GT pipeline 114 is connected to the turbine 113 and the other end of the first GT pipeline 114 is connected to the burner 123 so that the turbine 113 of the gas turbine 110 and the burner 123 are connected with each other via the first GT pipeline 114. The first air pipeline 141 is connected to the first GT pipeline 114 and supplies oxygen to the burner 123. The first oxygen sensor 144 is installed at an inlet of the burner 123 and measures a concentration of oxygen in the fluid flowing into the burner 123. The first GT damper 116 is installed on the first GT pipeline 114 and adjusts a flow rate of fluid flowing through the first GT pipeline 114 according to the oxygen concentration measured by the first oxygen sensor 144.

In a flow direction of the fluid flowing through the first GT pipeline 114, the first GT damper 116 is disposed on an upstream side of a connection point between the first GT pipeline 114 and the first air pipeline 141, and the first oxygen sensor 144 is disposed on a downstream side of the connection point between the first GT pipeline 114 and the first air pipeline 141.

The second air pipeline 142 branches from the first air pipeline 141 and supplies oxygen to the air preheater 122. The second GT pipeline 115 branches from the first GT pipeline 114 and is connected to the second air pipeline 142. The first air damper 146 is installed in the first air pipeline 141. The second air damper 146 is installed in the second air pipeline 142. The second GT damper 117 is installed in the second GT pipeline 115.

The first heat exchanger 140, which is a gas-air heater (GAH), is configured such that the first air pipeline 141 and the third air pipeline 143 extend through the first heat exchanger 140 and the second combustion gas discharged from the combustion chamber 121 passes through the first heat exchanger 140. Accordingly, oxygen flowing through the first air pipeline 141 and the third air pipeline 143 in the first heat exchanger 140 is heat-exchanged with the second combustion gas to increase the temperature of the oxygen. The third air pipeline 143 is separated from the first air pipeline 141 to directly supply oxygen to the burner 123. The fuel pipeline 148 supplies fuel such as coal or gas introduced from the outside to the third air pipeline 143.

The first heat exchange pipeline 124 transfers the second combustion gas discharged from the combustion chamber 121 through the first heat exchanger 150. The second oxygen sensor 145 is installed in the first heat exchange pipeline 124 and measures an oxygen concentration of the second combustion gas flowing into the first heat exchanger 150. The forced draft fan 152 is installed in the first air pipeline 141 and adjusts a pressure and flow rate of the second combustion gas introduced into the first heat exchanger 140 according to the oxygen concentration measured by the second oxygen sensor 145.

The second heat exchanger 150, which is a slip eco-friendly heat exchanger, is configured such that high-pressure or low-pressure feed water preheated by steam discharged from the steam turbine 130 passes therethrough. The second heat exchange pipeline 125 branches from the first heat exchange pipeline 124 and transfers the second combustion gas through the second heat exchanger 150. The first temperature sensor 135 is installed on the first heat exchange pipeline 124 at an outlet of the first heat exchanger 140 and measures the temperature of the second combustion gas passing through the first heat exchanger 140. The auxiliary damper 151 is installed in the second heat exchange pipeline 125 at an inlet of the second heat exchanger 150 and adjusts the flow rate of the second combustion gas supplied to the second heat exchanger 150 according to the temperature measured by the first temperature sensor 135.

The first steam pipeline 131 transfers steam from the combustion chamber 121 to the steam turbine 130. The second steam pipeline 132 returns the fluid discharged from the steam turbine 130 to the combustion chamber 121. The feed water pipeline 133 supplies the feed water preheated by the steam discharged from the steam turbine 130 to the second heat exchanger 150. The third steam pipeline 134 supplies steam that has passed through the second heat exchanger 150 to the second steam pipeline 132. The second temperature sensor 136 is installed on the third steam pipeline 132 and measures the temperature of a fluid flowing through the third steam pipeline 132. The feed water valve 137 is installed in the feed water pipeline 133 and adjusts the flow rate of feed water supplied to the second heat exchanger 150 according to the temperature measured by the second temperature sensor 136.

Figure 2:
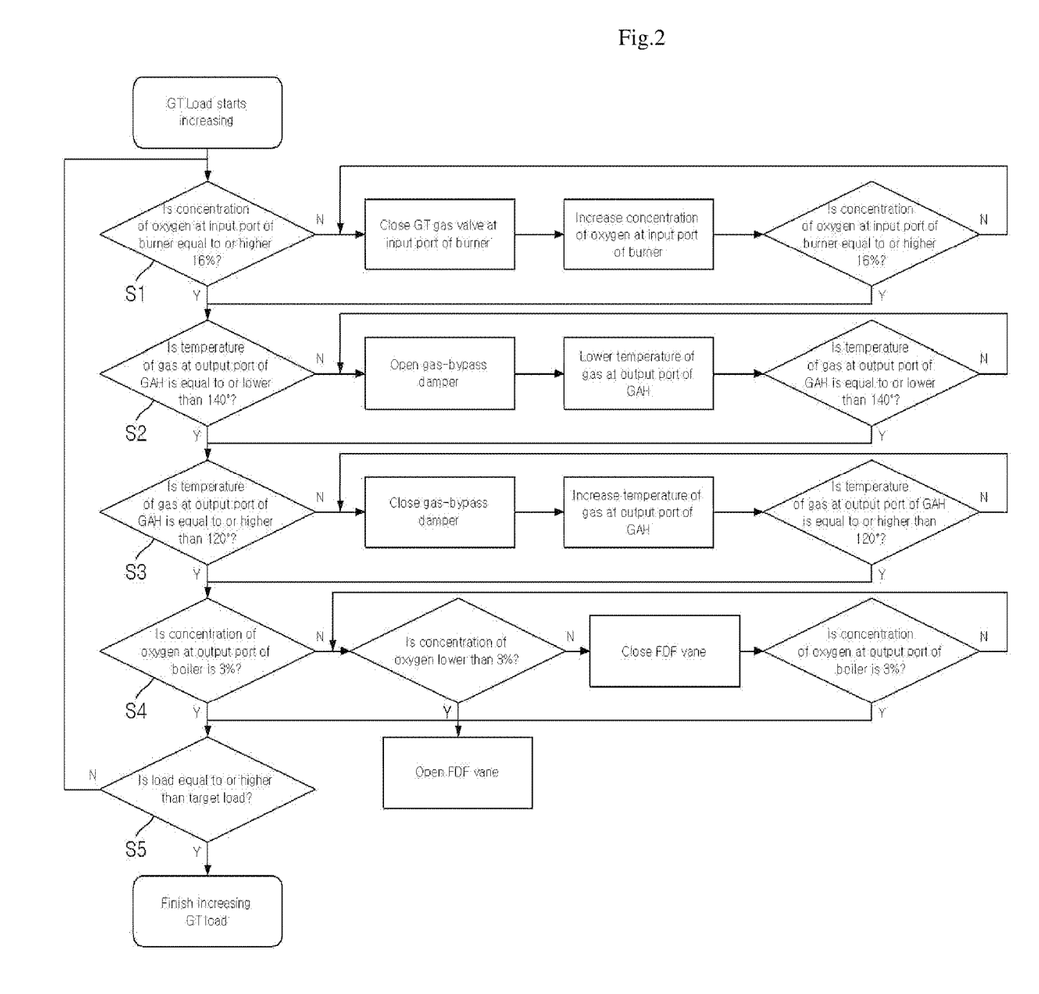
FIG. 2 is a flowchart illustrating a method of controlling the hybrid power generation facility illustrated in FIG. 1.

A method of controlling the hybrid power generation facility 100 according to an exemplary embodiment will be described with reference to FIG. 2. Referring to FIG. 2, if the load of the gas turbine 110 increases, the first oxygen sensor 144 measures the concentration of oxygen of the fluid supplied to the burner 123, and determines whether the measured concentration is greater than or equal to a first reference concentration (for example, 16%) (operation S1). If the measured concentration of oxygen of the fluid supplied to the burner 123 is lower than the first reference concentration, the first GT damper 116 installed in the first GT pipeline 114 operates to reduce the flow rate of the fluid or to block the first GT pipeline 114.

If the measured concentration of oxygen of the fluid supplied to the burner 123 is greater than or equal to the first reference concentration, the first temperature sensor 135 measures the temperature of the second combustion gas discharged from the first heat exchanger 140 through the first heat exchange pipeline 124 and determines whether the measured temperature is equal to or lower than a first reference temperature (for example, 140° C.) (operation S2). If the measured temperature of the second combustion gas discharged from the first heat exchanger 140 through the first heat exchange pipeline 124 is higher than the preset first reference temperature, the auxiliary damper 151 operates to open the second heat exchange pipeline 124.

If the measured temperature of the second combustion gas discharged from the first heat exchanger 140 through the first heat exchange pipeline 124 is equal to or lower than the first reference temperature, the first temperature sensor 135 measures the temperature of the second combustion gas discharged from the first heat exchanger 140 through the first heat exchange pipeline 124, and determines whether the measured temperature is equal to or higher than a second reference temperature (operation S3). If the measured temperature of the second combustion gas discharged from the first heat exchanger 140 through the first heat exchange pipeline 124 is lower than the preset second reference temperature, the auxiliary damper 151 operates to reduce the flow rate of the fluid flowing through the second heat exchange pipeline 124.

If the measured temperature of the second combustion gas discharged from the first heat exchanger 140 through the first heat exchange pipeline 124 is higher than the second reference temperature, the second oxygen sensor 145 measures the concentration of oxygen of the second combustion gas discharged from the boiler 120 and supplied to the first heat exchanger 140 through the first heat exchange pipeline 124 and determines whether the measured concentration is a preset second reference concentration (for example, 3%) (operation S4). If the measured concentration of oxygen in the second combustion gas supplied to the first heat exchanger 140 through the first heat exchange pipeline 124 is equal to the second reference concentration, the hybrid power generation facility 100 determines whether an overall load of the facility has reached a target load (operation S5), increases the load of the gas turbine 110 if the overall road does not reach the target road, and performs the operations S1 to S4.

If the measured concentration of oxygen in the second combustion gas supplied to the first heat exchanger 140 through the first heat exchange pipeline 124 is lower than the second reference concentration, the vane of the forced draft fan 152 is opened. On the other hand, if the measured concentration of oxygen in the second combustion gas supplied to the first heat exchanger 140 through the first heat exchange pipeline 124 is higher than the second reference concentration, the vane of the forced draft fan 152 is adjusted to reduce the flow rate of the second combustion gas.

As described above, in the hybrid power generation facility 100 and the control method thereof according to the present disclosure, the first combustion gas discharged from the gas turbine 110 is directly transferred to the air preheater 122 through the second air pipeline 142, and the opening of the first GT damper 116 is adjusted according to the oxygen concentration measured by the first oxygen sensor 144 installed in the first GT pipeline 114. Therefore, the hybrid power generation facility 100 can be operated without excessively limiting the flow rate of the first combustion gas supplied to the boiler 120, and the overall operation efficiency of the hybrid power generation facility 100 can be increased by adjusting a mixing ratio of the first combustion gas and the oxygen supplied to the boiler 120.

In the hybrid power generation facility 100 and the control method thereof according to the present disclosure, the first heat exchanger 140 is provided so that the oxygen supplied to the facility is preheated by the second combustion gas discharged from the boiler 120, and a portion of the second combustion gas which cannot be absorbed by the first heat exchanger 140 passes through the second heat exchanger 150. Therefore, it is possible to recover the heat of the second combustion gas through the second heat exchanger 150, thereby increasing the overall operation efficiency of the facility.

What is claimed is:

1. A hybrid power generation facility comprising:
   a gas turbine including a compressor configured to compress air introduced from an outside, a combustor configured to mix the compressed air with fuel and to combust the compressed air and fuel mixture, and a turbine configured to produce power with first combustion gas discharged from the combustor;
   a boiler including a combustion chamber and a burner installed in the combustion chamber and into which the first combustion gas discharged from the turbine of the gas turbine is introduced;
   a steam turbine through which steam generated in the combustion chamber passes;
   a first GT (gas turbine) pipeline connecting the turbine of the gas turbine and the burner to each other;
   a first air pipeline connected to the first GT pipeline and configured to supply oxygen to the burner;
   a first oxygen sensor installed at an inlet of the burner and configured to measure a concentration of oxygen of a fluid flowing to the burner;
   a first GT damper installed in the first GT pipeline and configured to adjust a flow rate of a fluid flowing through the first GT pipeline according to the oxygen concentration measured by the first oxygen sensor;
   a first heat exchanger through which the first air pipeline extends and second combustion gas discharged from the combustion chamber passes such that oxygen flowing through the first air pipeline is heat-exchanged with the second combustion gas in the first heat exchanger;
   a second heat exchanger through which feed water passes preheated by steam discharged from the steam turbine;
   a first heat exchange pipeline configured to transfer the second combustion gas discharged from the combustion chamber through the first heat exchanger;
   a second heat exchange pipeline branched from the first heat exchange pipeline and configured to transfer the second combustion gas discharged through the second heat exchanger;
   a first temperature sensor installed in the first heat exchange pipeline at an outlet of the first heat exchanger and configured to measure a temperature of the second combustion gas passing through the first heat exchanger; and
   an auxiliary damper installed in the second heat exchange pipeline at an inlet of the second heat exchanger and configured to adjust a flow rate of the second combustion gas supplied to the second heat exchanger according to the temperature measured by the first temperature sensor.

2. The hybrid power generation facility according to claim 1, wherein the boiler further comprises an air preheater installed in the combustion chamber, and
   the hybrid power generation facility further comprises a second air pipeline branched from the first air pipeline to supply oxygen to the air preheater and a second GT pipeline branched from the first GT pipeline and connected to the second air pipeline.

3. The hybrid power generation facility according to claim 2, further comprising:
   a first air damper installed in the first air pipeline;
   a second air damper installed in the second air pipeline; and
   a second GT damper installed in the second GT pipeline.

4. The hybrid power generation facility according to claim 1, further comprising:
   a third air pipeline extending through the first heat exchanger to supply oxygen to the burner; and
   a fuel pipeline supplying fuel introduced from an outside to the third air pipeline.

5. The hybrid power generation facility according to claim 1, further comprising:
   a first heat exchange pipeline configured to transfer the second combustion gas discharged from the combustion chamber through the first heat exchanger;
   a second oxygen sensor installed in the first heat exchange pipeline and configured to measure a concentration of oxygen of the second combustion gas supplied to the first heat exchanger; and
   a forced draft fan installed in the first air pipeline and configured to adjust a pressure of oxygen and a flow rate of a fluid supplied to the first heat exchanger according to the oxygen concentration measured by the second oxygen sensor.

6. The hybrid power generation facility according to claim 1, further comprising:
   a first steam pipeline configured to transfer steam from the combustion chamber to a steam turbine;
   a second steam pipeline configured to return a fluid discharged from the steam turbine to the combustion chamber;
   a feed water pipeline configured to supply feed water preheated by steam discharged from the steam turbine to the second heat exchanger;

a third steam pipeline configured to transfer steam passing through the second heat exchanger to the second steam pipeline;
a second temperature sensor installed in the third steam pipeline and configured to measure a temperature of fluid flowing through the third steam pipeline; and
a feed water valve installed in the feed water pipeline and configured to adjust a flow rate of the feed water supplied to the second heat exchanger according to the temperature measured by the second temperature sensor.

7. The hybrid power generation facility according to claim 1, wherein the first oxygen sensor measures a concentration of oxygen of a fluid supplied to the burner and determines whether the measured concentration is greater than or equal to a first reference concentration, and
wherein if the concentration of oxygen of the fluid supplied to the burner is lower than the first reference concentration, the first GT damper throttles the first GT pipeline to reduce a flow rate of the fluid flowing through the first GT pipeline or block the first GT pipeline.

8. The hybrid power generation facility according to claim 1, wherein the first temperature sensor measures a temperature of the second combustion gas discharged from the first heat exchanger through the first heat exchange pipeline and determines whether the measured temperature is equal to or lower than a first reference temperature, and
wherein if the measured temperature of the second combustion gas discharged from the first heat exchanger through the first heat exchange pipeline is higher than the first reference temperature, the auxiliary damper operates to open the second heat exchange pipeline.

9. The hybrid power generation facility according to claim 8, wherein if the temperature of the second combustion gas discharged from the first heat exchanger through the first heat exchange pipeline is equal to or lower than the first reference temperature, the first temperature sensor measures the temperature of the second combustion gas discharged from the first heat exchanger through the first heat exchange pipeline and determines whether the measured temperature is equal to or higher than a second reference temperature, and
wherein if the measured temperature of the second combustion gas discharged from the first heat exchanger through the first heat exchange pipeline is lower than the second reference temperature, the auxiliary damper operates to reduce the flow rate of fluid flowing through the second heat exchange pipeline or block the second heat exchange pipeline.

10. The hybrid power generation facility according to claim 5, wherein the second oxygen sensor measures a concentration of oxygen of the second combustion gas discharged from the boiler and supplied to the first heat exchanger through the first heat exchange pipeline and determines whether the measured concentration is equal to a second reference concentration, and
wherein if the concentration of oxygen in the second combustion gas supplied to the first heat exchanger through the first heat exchange pipeline is lower than the second reference concentration, a vane of the forced draft fan is opened, and if the concentration of oxygen in the second combustion gas supplied to the first heat exchanger through the first heat exchange pipeline is higher than the second reference concentration, the vane of the forced draft fan is adjusted to reduce the flow rate of the second combustion gas.

11. A method of controlling a hybrid power generation facility including a gas turbine including a compressor configured to compress air introduced from an outside, a combustor configured to mix compressed air supplied from the compressor with fuel and to combust the air and fuel mixture, and a turbine configured to produce power with first combustion gas discharged from the combustor, a boiler including a combustion chamber and a burner installed in the combustion chamber and into which the first combustion gas discharged from the turbine of the gas turbine is introduced, a steam turbine through which steam generated in the combustion chamber passes, a first GT (gas turbine) pipeline connected between the turbine of the gas turbine and the burner, a first air pipeline connected to the first GT pipeline and configured to supply oxygen to the burner, a first oxygen sensor installed at an inlet of the burner and configured to measure an oxygen concentration of a fluid flowing into the burner, a first GT damper installed in the first GT pipeline and configured to control a flow rate of a fluid flowing through the first GT pipeline according to the oxygen concentration measured by the first oxygen sensor, a first heat exchanger through which the first air pipeline extends and second combustion gas discharged from the combustion chamber passes such that oxygen flowing through the first air pipeline is heat-exchanged with the second combustion gas in the first heat exchanger, a second heat exchanger through which feed water passes preheated by steam discharged from the steam turbine, a first heat exchange pipeline configured to transfer the second combustion gas discharged from the combustion chamber through the first heat exchanger, a second heat exchange pipeline branched from the first heat exchange pipeline and configured to transfer the second combustion gas discharged through the second heat exchanger, a first temperature sensor installed in the first heat exchange pipeline at an outlet of the first heat exchanger and configured to measure a temperature of the second combustion gas passing through the first heat exchanger, and an auxiliary damper installed in the second heat exchange pipeline at an inlet of the second heat exchanger and configured to control a flow rate of the second combustion gas supplied to the second heat exchanger according to the temperature measured by the first temperature sensor,
the method comprising:
measuring, by the first oxygen sensor, a concentration of oxygen of a fluid supplied to the burner;
determining whether the measured concentration is greater than or equal to a first reference concentration;
throttling, by the first GT damper, the first GT pipeline to reduce a flow rate of the fluid if the measured concentration is lower than the first reference concentration;
measuring, by the first temperature sensor, the temperature of the second combustion gas discharged from the first heat exchanger through the first heat exchange pipeline;
determining whether the measured temperature is equal to or lower than a first reference temperature; and
opening, by the auxiliary damper, the second heat exchange pipeline if the measured temperature of the second combustion gas is higher than the first reference temperature.

12. The method according to claim 11, further comprising:
determining whether the measured temperature of the second combustion gas discharged from the first heat exchanger is equal to or higher than a second reference temperature if the temperature of the second combustion gas discharged from the first heat exchanger through the first heat exchange pipeline is equal to or lower than the first reference temperature; and reducing, by the auxiliary damper, a flow rate of a fluid by throttling the second heat exchange pipeline if the temperature of the second combustion gas discharged from the first heat exchanger through the first heat exchange pipeline is lower than the second reference temperature.

13. The method according to claim 12, wherein the hybrid power generation facility further includes the first heat exchanger through which the first air pipeline extends and a second combustion gas discharged from the combustion chamber passes such that oxygen flowing through the first air pipeline is heat-exchanged with the second combustion gas, the first heat exchange pipeline configured to transfer the second combustion gas discharged from the combustion chamber through the first heat exchanger, a second oxygen sensor installed in the first heat exchanger pipeline and configured to measure a concentration of oxygen of the second combustion gas supplied to the first heat exchanger, and a forced draft fan installed in the first air pipeline and configured to adjust a pressure of oxygen supplied to the first heat exchanger according to the oxygen concentration measured by the second oxygen sensor, the method further comprising:

determining whether the measured concentration of oxygen of the second combustion gas discharged from the boiler and supplied to the first heat exchanger through the first heat exchange pipeline is a second reference concentration;

opening a vane of the forced draft fan if the measured concentration is lower than the second reference concentration; and reducing a flow rate of the second combustion gas by throttling the vane of the forced draft fan if the measured concentration is higher than the second reference concentration.

14. The method according to claim 13, wherein the method further comprising:

determining whether an overall load of the hybrid power generation facility has reached a target load if the measured concentration is equal to the second reference concentration; and increasing the load of the gas turbine if the overall load does not reach the target load.

15. The hybrid power generation facility according to claim 1, wherein in a flow direction of fluid flowing through the first GT pipeline, the first GT damper is disposed on an upstream side of a connection point between the first GT pipeline and the first air pipeline, and the first oxygen sensor is disposed at a position between the connection point and the burner.

* * * * *